Patented Oct. 7, 1952

2,613,209

UNITED STATES PATENT OFFICE 2,613,209

WOOL DYESTUFFS

Emil Beniers, Frankfort-on-the-Main-Hochst, Germany, assignor to Farbwerke Hoechst vormals Meister Lucius & Bruning, Frankfort-on-the-Main-Hochst, Germany No Drawing. Application June 26, 1951, Serial No. 233,713. In Germany July 14, 1950

4 Claims. (Cl. 260—267)

The present invention relates to new wool dyestuffs, more particularly it relates to dyestuffs corresponding in the free form to the general formula

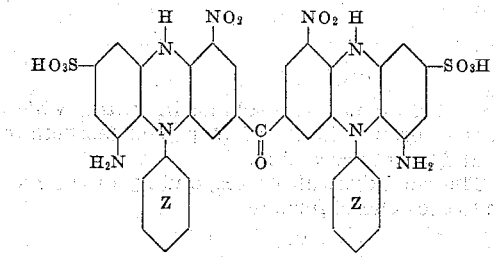

wherein the benzene nucleus Z may contain substituents, such as halogen, alkyl-, alkoxy- or sulfonic acid groups.

In German specification No. 545,859 is described the manufacture of brown wool dyestuffs by the reaction of one molecular proportion of a 2.6-diamino-diphenylamine sulfonic acid with one molecular proportion of a 2.4.6-trinitrobenzene derivative having in the 1-position an atom or an atomic group capable of being replaced, and then heating the derivative thus formed in an alkaline medium to bring about azine ring closure. Dyestuffs are so obtained which are distinguished by their good fastness to light. However, their fastness to water, to fulling and to washing does not fulfil all requirements.

I have found that brown wool dyestuffs having very good fastness properties are obtained by using for the condensation reaction, instead of, for instance, 2.4.6-trinitro-chlorobenzene, a 3.5; 3'.5'-tetranitro-benzophenone containing in the 4.4'-positions atoms or groups capable of being exchanged. Such a compound is capable of reacting twice with 2.6-diamino-diphenylamine sulfonic acid, and dyestuffs with two azine rings are formed, for example, according to the following scheme:

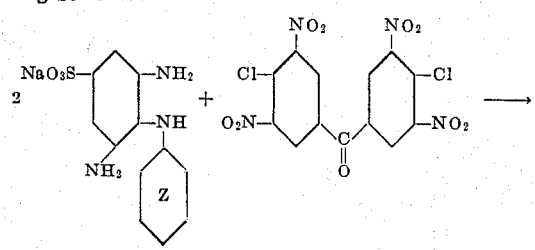

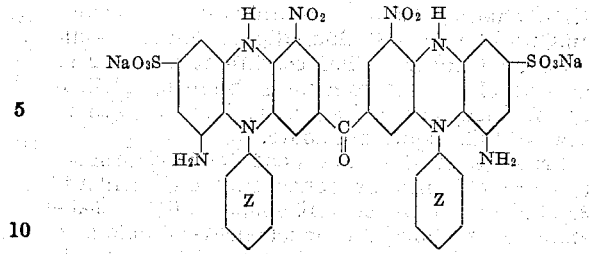

In the above formulae the benzene nucleus Z may contain substituents, such as halogen or alkyl, alkoxy or sulfonic acid groups.

The 4.4'- dichloro-3.5;3'.5'- tetranitro-benzophenone illustrated by way of example in the above scheme may be prepared by nitrating 4.4'-dichloro-benzophenone.

Azine ring closure in the condensation product first formed may advantageously be brought about by heating the condensation product in an alkaline solution at a temperature ranging from about 70° C. to 100° C.

As compared with the dyestuffs described in the aforesaid specification, the new brown dyestuffs of the present invention possess very good properties of wet fastness and an improved fastness to light.

The following examples serve to illustrate the invention, but they are not limited thereto, the parts being by weight:

Example 1

43 parts of 4.4'-dichloro-3.5;3'.5'-tetranitro-benzophenone are boiled for several hours in alcohol with 56 parts of 2.6-diamino-diphenyl-amine-4-sulfonic acid and 66 parts of sodium acetate. When the condensation is complete, the intermediate product is separated by filtering with suction, dissolved in water and, after the addition of 13 parts of sodium carbonate, the azine ring closure is brought about at 90° C. The dyestuff so formed is isolated and purified by dissolution and reprecipitation. It dyes wool brown tints of very good fastness to light and wet fastness.

Example 2

40 parts of 4.4'-dichloro-3.5;3'.5'-tetranitro-benzophenone are condensed with 55 parts of 2.6-diamino - 4'- methyl-diphenylamine - 4 - sulfonic acid in the presence of sodium acetate in a butanol solution of 10 per cent. strength by heating the mixture for several hours at 70° C.–80° C. After the addition of 14 parts of sodium carbonate, stirring is continued at 100° C. until the azine ring closure has taken place. The dyestuff is isolated as described in Example 1. It dyes wool brown tints having very good wet fastness properties and fastness to light. The dyestuff corresponds to the following formula:

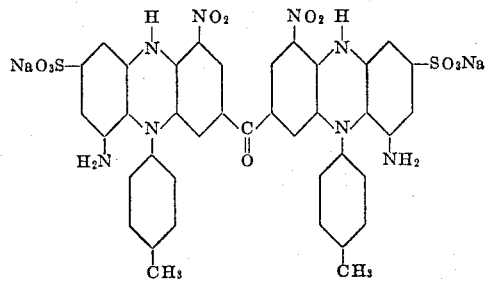

*Example 3*

By condensing equimolecular proportions of 4.4'-dichloro - 3.5;3'.5'-tetranitro-benzophenone and 2.6-diamino - 2'-chlorodiphenylamine-4-sulfonic acid under similar conditions in water or an alcohol, a brown dyestuff is obtained, of which the fastness properties are similar to those of the dyestuffs mentioned above.

Products of the same good fastness properties are obtained by condensing 4.4'-dichloro-3.5;3'.5'-tetranitro-benzophenone with 2.6-diamino-2'-methoxy-benzophenone-4-sulfonic acid or 2.6 - diamino - benzophenone - 4.4'-disulfonic acid.

I claim:

1. The wool dyestuffs corresponding in the free form to the general formula

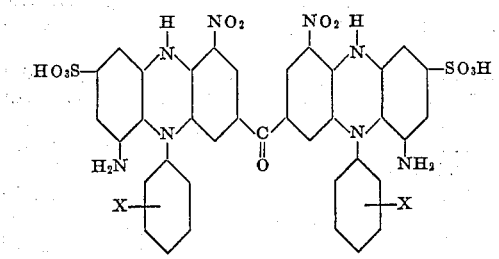

wherein the X's stand for members of the group consisting of hydrogen, chlorine, methyl, methoxy and sulfonic acid groups, being brown powders, soluble in water, which dye wool brown shades of very good fastness to light and to wet processing.

2. The wool dyestuff corresponding in the free form to the general formula

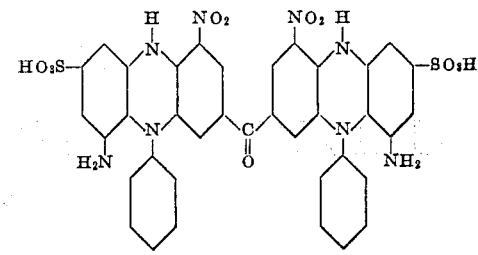

being a brown powder, soluble in water, which dyes wool brown shades of very good fastness to light and to wet processing.

3. The wool dyestuff corresponding in the free form to the general formula

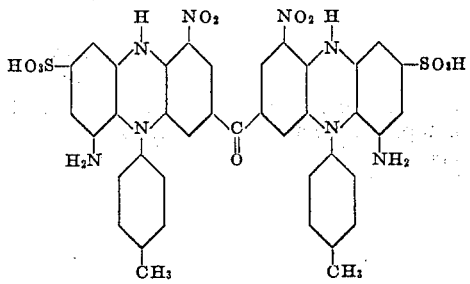

being a brown powder, soluble in water, which dyes wool brown shades of very good fastness to light and to wet processing.

4. The wool dyestuff corresponding in the free form to the general formula

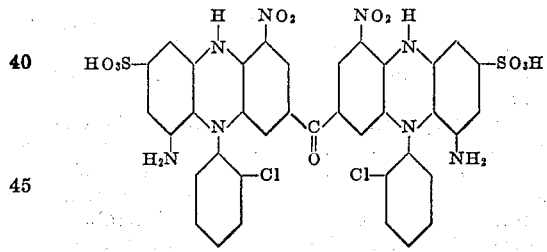

being a brown powder, soluble in water, which dyes wool brown shades of very good fastness to light and to wet processing.

EMIL BENIERS.

No references cited.